United States Patent [19]
Straub

[11] Patent Number: 5,930,685
[45] Date of Patent: Jul. 27, 1999

[54] APPARATUS AND METHOD USING FAST AUTOMATIC LINK ESTABLISHMENT WAVEFORM FOR HIGH FREQUENCY COMMUNICATIONS

[75] Inventor: Grant J. Straub, Marion, Iowa

[73] Assignee: Rockwell International Corporation, Costa Mesa, Calif.

[21] Appl. No.: 08/863,885

[22] Filed: May 28, 1997

[51] Int. Cl.$^6$ ....................................... H04B 1/00
[52] U.S. Cl. ..................... 455/72; 455/517; 370/477; 370/521
[58] Field of Search ................. 455/403, 434, 455/445, 450, 455, 509, 516, 517, 72, 422, 432, 435–436; 370/310, 315, 329, 477, 496, 521

[56] References Cited

U.S. PATENT DOCUMENTS

| | | |
|---|---|---|
| 4,155,040 | 5/1979 | Harmon et al. . |
| 4,328,581 | 5/1982 | Harmon et al. . |
| 5,363,402 | 11/1994 | Harmon . |
| 5,694,454 | 12/1997 | Hill et al. ................................. 455/403 |
| 5,754,944 | 5/1998 | Dominiak et al. ...................... 455/509 |

OTHER PUBLICATIONS

"Military Standard Interperability and Performance Standards for Medium and High Frequency Radio Equipment," MIL–STD–188–141A Notice 2.

*Primary Examiner*—Doris H. To
*Attorney, Agent, or Firm*—Kyle Eppele; James P. O'Shaughnessy

[57] ABSTRACT

An automatic link establishment (ALE) method of establishing a link between two or more HF radios or stations, and an apparatus using the same, are disclosed. The invention provides a transmission protocol that allows HF radios to rapidly exchange call data to enable the first radio and second radio to have knowledge of the frequency propagating characteristics used for communication. The method includes transmitting 24 bit words from the first station to the second station and vice-a-versa in the CALL. The words include a three bit preamble, at least about 3 bits of data to be transmitted from the second station to the first station, and a compressed representation of three characters of the address of at least one of the stations. The number of words transmitted during the CALL, RESPONSE and ACKNOWLEDGE are greatly reduced from the protocol defined in MIL-STD-188-141A Notice 2.

20 Claims, 7 Drawing Sheets

| WORD TYPE | CODE BITS | FUNCTIONS | SIGNIFICANCE |
|---|---|---|---|
| THRU | 001 | MULTIPLE (AND INDIRECT) ROUTING | PRESENT MULTIPLE DIRECT DESTINATIONS FOR GROUP CALLS (AND FUTURE INDIRECT RELAYS, RESERVED) |
| TO | 010 | DIRECT ROUTING | PRESENT DIRECT DESTINATION FOR INDIVIDUAL AND NET CALLS |
| COMMAND | 110 | ORDERWIRE CONTROL AND STATUS | ALE SYSTEM-WIDE STATION (AND OPERATOR) ORDERWIRE FOR COORDINATION, CONTROL, STATUS, AND SPECIAL FUNCTIONS |
| FROM | 100 | INDENTIFICATION (AND INDIRECT ROUTING) | IDENTIFICATION OF PRESENT TRANSMITTER WITHOUT TERMINATION (AND PAST ORIGINATOR AND RELAYERS, RESERVED) |
| THIS IS | 101 | TERMINATOR AND IDENTIFICATION, CONTINUING | IDENTIFICATION OF PRESENT TRANSMITTER, SIGNAL TERMINATIONS, PROTOCOL CONTINUATION |
| THIS WAS | 011 | TERMINATOR AND IDENTIFICATION, QUITTING | IDENTIFICATION OF PRESENT TRANSMITTER, SIGNAL AND PROTOCOL TERMINATION |
| DATA | 000 | EXTENSION AND INFORMATION | EXTENSION OF DATA FIELD OF THE PREVIOUS ALE WORK, OR INFORMATION DEFINED BY THE PREVIOUS COMMAND |
| REPEAT | 111 | DUPLICATION AND INFORMATION | DUPLICATION OF THE PREVIOUS PREAMBLE, OR INFORMATION DEFINED BY THE PREVIOUS COMMAND |

Fig. 7 FAST ALE CALL WITH LQA EXCHANGE TO "GRAVEL" FROM "ROCKS"

APPARATUS AND METHOD USING FAST AUTOMATIC LINK ESTABLISHMENT WAVEFORM FOR HIGH FREQUENCY COMMUNICATIONS

BACKGROUND OF THE INVENTION

The present application makes reference to MIL-STD-188-141A Notice 2, which is herein incorporated by reference.

The present invention relates generally to high frequency (HF) communication systems using automatic link establishment (ALE) protocols and waveforms of the type defined in MIL-STD-188-141A Notice 2. More particularly, the present invention relates to an improved ALE waveform and protocol for establishing a link more quickly than has been otherwise possible, while exchanging link quality analysis (LQA) information.

High frequency (HF) radio has traditionally been a medium used to provide economical, long and short distance non-line-of-sight communications. However, establishing communication links on various frequencies between remotely positioned HF radios or stations can be difficult due to the interfering effects of the environment and the terrain. Because changing conditions continuously alter the quality of various communication links, an HF radio operator has historically been required to be very skilled.

Automatic link establishment (ALE) has been available in HF radios for a considerable time. Commonly used ALE methods and protocols facilitating communications between two or more HF radios comply with a protocol described in detail in the military standard document published by the United States Government under the Publication No. MIL-STD-188-141A Notice 2 (hereinafter Notice 2). This document is openly available to the public, with unlimited distribution. In the current algorithms defined by Notice 2, link establishment between HF radios takes longer than is preferred in the HF radio user community. Generally, the user community desires faster linking while still maintaining the Notice 2 feature of interchanging link quality analysis (LQA) information that allows optimization of subsequent voice or digital data exchange. Current Notice 2 compliant systems require approximately 13 seconds of connect time for radios using only three characters in their address. To many in the HF radio community, this is far too long. Users desire a longer address length, but do not like the resulting additional connect times. Also, no standards exist in Notice 2 to allow radios to interact digitally once a link has been established.

SUMMARY OF THE INVENTION

An ALE method of establishing a link between two or more HF radios or stations, and an apparatus using the same, are disclosed. The invention provides a transmission protocol that allows HF radios to rapidly exchange call data to enable the first radio and second radio to have knowledge of the frequency propagating characteristics used for communication. The method includes transmitting 24 bit words from the first station to the second station and vice-a-versa in the CALL. The words include a three bit preamble, at least about 3 bits of data to be transmitted from the second station to the first station, and a compressed representation of three characters of the address of at least one of the stations. In some embodiments, the number of words transmitted during the CALL, RESPONSE and ACKNOWLEDGE portions of the ALE are greatly reduced from the protocol defined in Notice 2. The invention further expands the packed or compressed address form to reduce transaction times of exchanging data while in a link.

BRIEF DESCRIPTION OF THE DRAWINGS

The invention may be more fully understood by reading the following description of a preferred embodiment of the invention in conjunction with appended drawings wherein.

DETAILED DESCRIPTION OF THE PREFERRED EMBODIMENTS

Figure 1:
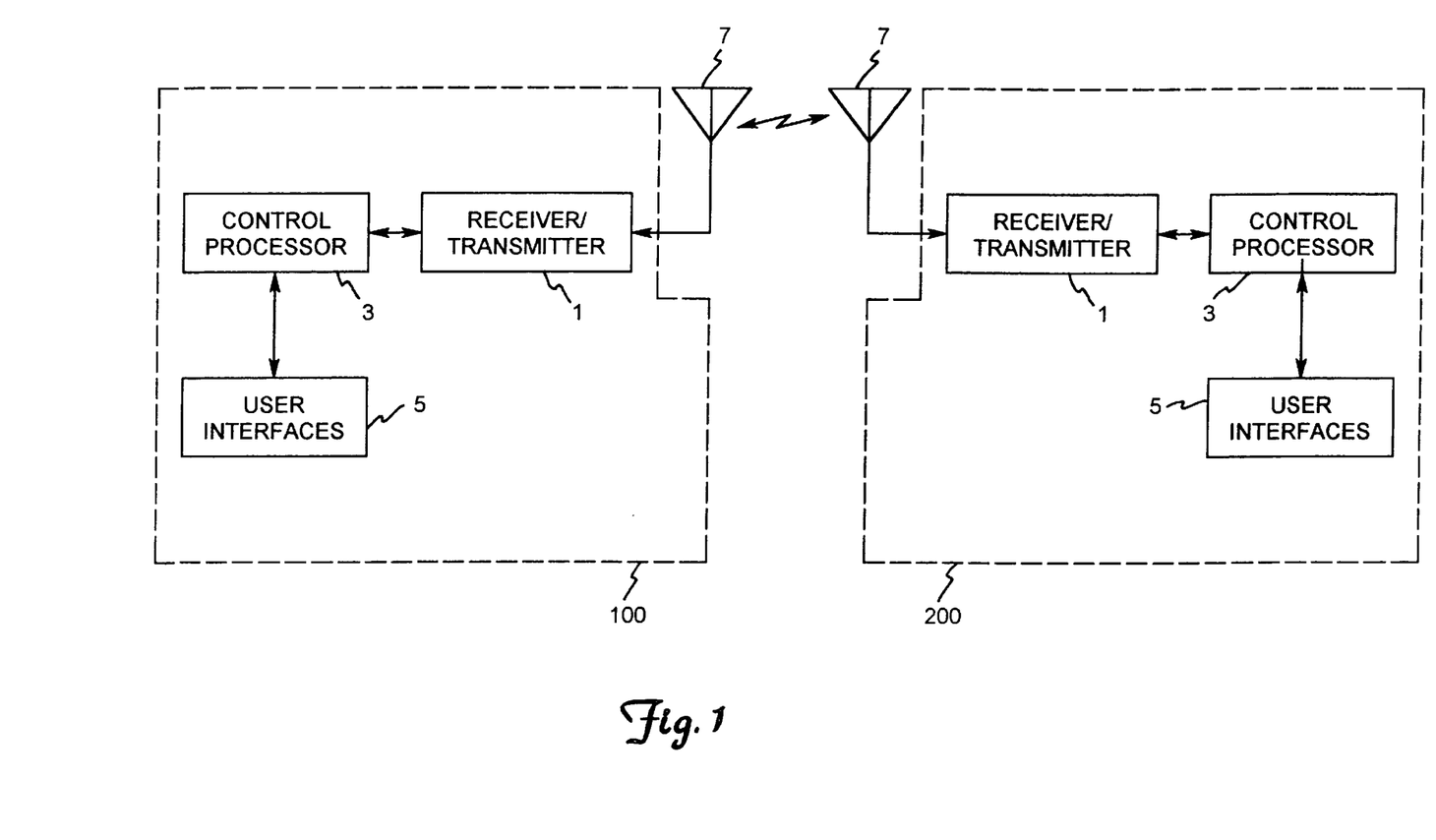
FIG. 1 is a block diagram of a HF communication system adapted to implement the ALE waveforms and protocols of the present invention.

FIG. 1 is a block diagram of an HF communication system which has at least two stations with discrete addresses. The communication system illustrated in FIG. 1 is provided as a non-limiting example of typical functions in HF radios or stations of the type which can utilize the fast ALE waveforms and protocols of the present invention. Numerous features of typical HF radios which are well known in the art are not illustrated in order to simplify the following discussions. In general, the ALE waveforms, methods and protocols of the present invention can be implemented, with slight modifications, using HF radios or communication systems designed to perform ALE functions using the waveforms disclosed in Notice 2. The HF radios or communication systems of the present invention preferably include a backward compatibility feature allowing them to perform ALE communication functions using the Notice 2 waveform and protocol if other participating radios do not include the capability to utilize the fast ALE waveforms and protocols of the present invention.

As illustrated in FIG. 1, each station has a receiver/transmitter 1, a control processor 3, user interfaces 5 and an antenna 7. The receiver/transmitter 1 must be capable of being tuned to any of multiple available HF communication frequencies or channels. The user interfaces 5 preferably provide at least a terminal for the entry of an alphabetical, numeric or alphanumeric codes for the addresses that an operator desires to contact. Each station is assigned a unique address that can be either alphabetical, numeric or alphanumeric code. In preferred embodiments, the address for each of stations 100 and 200 has an alphanumeric code having up to six characters from the basic 38 character ascii subset (defined for example at page 59 of Notice 2). For discussion purposes only, station 100 will be designated as the calling station and station 200 will be designated as the called station. By way of example for illustration purposes, assume that the alphanumeric address of station 100 is ROCKS, while the alphanumeric address of station 200 is GRAVEL.

Prior to the initiation of a call to another station, the operator of station 100 will enter the address of the station or stations to be called (e.g., GRAVEL) by way of a data entry terminal. Upon the control processor receiving the proper input from the operator, the transmitting station 100 will begin an automatic sequence of events which will result in a communications link being established between station 100 and the second remote station 200.

First, processor 3 of station 100 will select, from a group of channels common to both stations, the channel with the highest link quality and initiate a transmission to the station identified by the selected address on the preferred channel. The transmission is referred to as a CALL. The LQA data used in selecting the highest quality channel can be stored in a memory unit within the processor 3 and is obtained either from the receptions of previous transmissions or provided by initialization data input to the system prior to initial operation. The receiving station 200 is constantly monitoring in a sequential order (scanning) the group of common channels on which it is capable of operating. When it receives an address message from the transmitter 100, it will sync upon the received message, decode the address information, recognize that the message is addressed "To" it, recognize that the transmission came from station 100, and disable the scanning. The called station 200 then transmits an answer called a RESPONSE to the calling station 100 on the same channel to verify that contact has been established.

Station 100, which in a similar fashion synchronizes its receiver upon the received message, decodes the address information in the RESPONSE and verifies that the RESPONSE is directed "To" station 100 from station 200. At this point the calling station 100 transmits an ACKNOWLEDGEMENT indicating to station 200 that the channel is propagating in both directions. After this third transmission, the operators are signaled that a link has been accomplished. The operators can now exchange voice or data. Each time either station receives an address transmission indicating whom the transmission is from, the link quality memory is updated for link quality according to the channel that the receiving station receives the information on and the address of the transmitting station.

1. ALE Standard Waveform Description and Definitions

Figure 2:
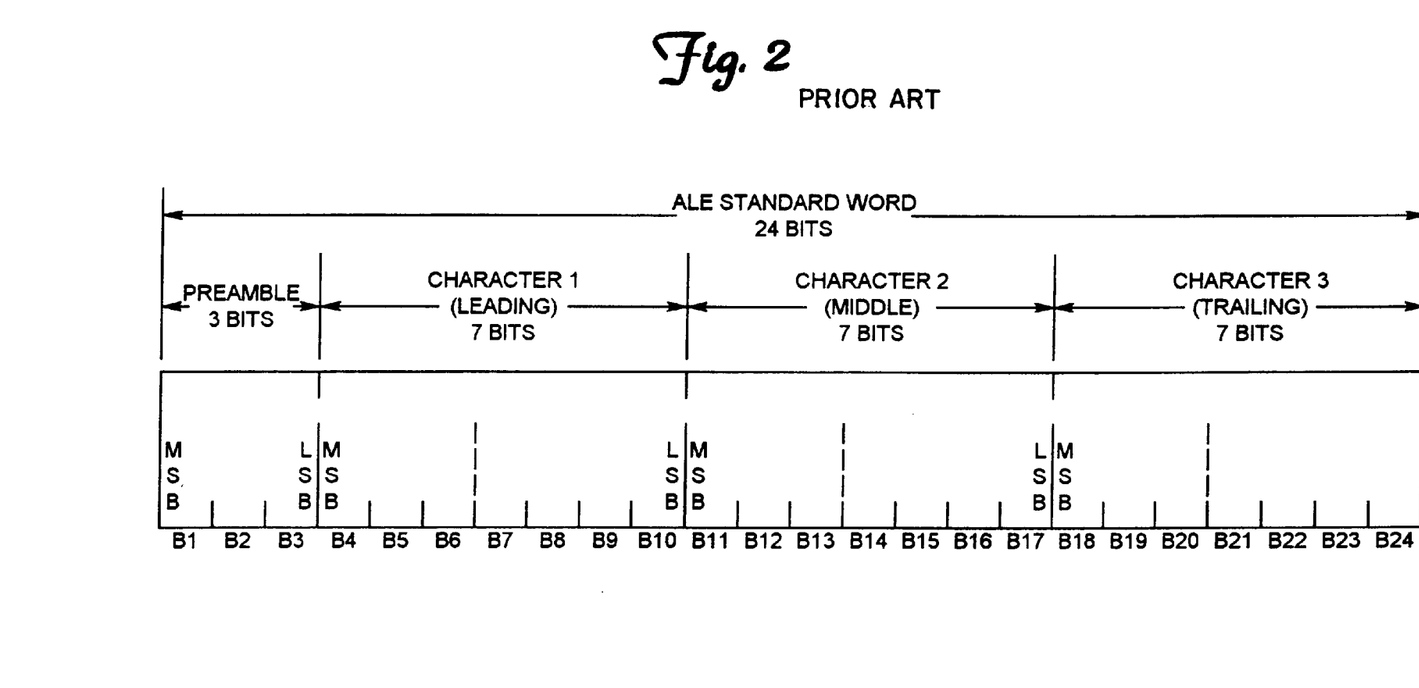
FIG. 2 is an illustration of a standard 24 bit word having a format used in Notice 2.
Figure 3:
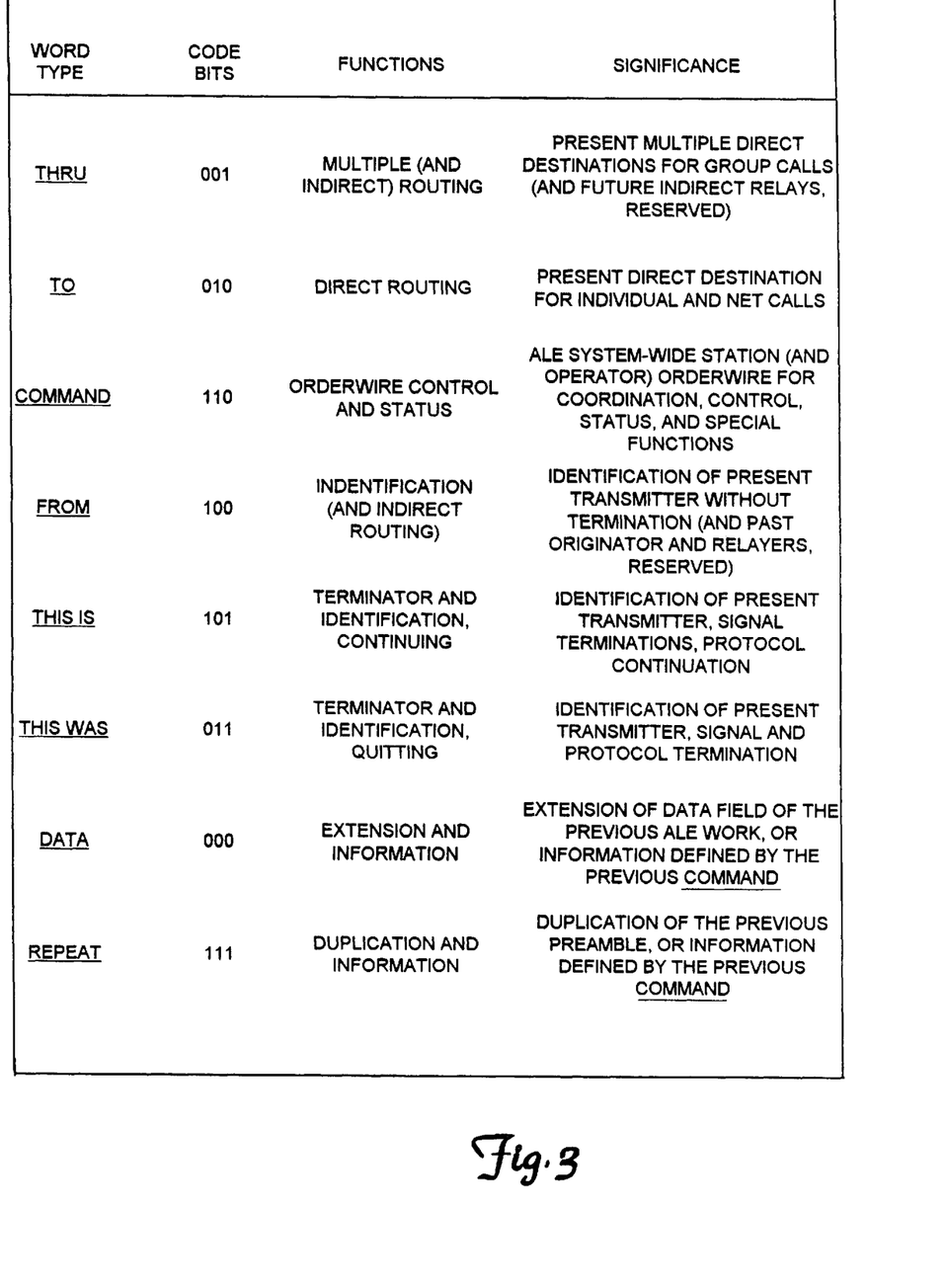
FIG. 3 is a table illustrating ALE word type preambles as defined in Notice 2.

FIG. 2 is a representation of a standard ALE word format used during the CALL, RESPONSE and ACKNOWLEDGE portions of a link establishment exchange between first and second HF stations, as defined in Notice 2. As is known in the art, the ALE words defined in Notice 2 will each, in some format, be transmitted three times and thus are triple redundant words (TRWs). The ALE standard word illustrated in FIG. 2 has 24 data bits including a three bit preamble and three seven bit representations of ascii characters. The eight preambles defined in Notice 2 include THRU, TO, COMMAND, FROM, THIS IS (sometimes referred to as TIS), THIS WAS, DATA and REPEAT. Each preamble defines a different type of ALE word. The eight standard preambles are described in Notice 2 and in the table of FIG. 3.

2. The Fast ALE Waveforms and Protocols of the Present Invention

The fast ALE waveforms and protocols of the present invention utilize a number of observations to help increase the speed at which an HF communications link is established between two or more stations or radios. The observations include: (1) Fielded user networks have not required addresses greater than six characters; (2) Fast turn-around/ linking is needed; (3) Point-to-point and StarNet connections are generally the only user desired connectivity setups; (4) Some LQA information is needed and should be exchanged; (5) frequency shift key (FSK) tones, TRWs and golay are very effective means to link in a asychronous mode; and (6) backward compatibility with Notice 2 is desirable.

A. Modifications to Data Portion of ALE

Figure 4:
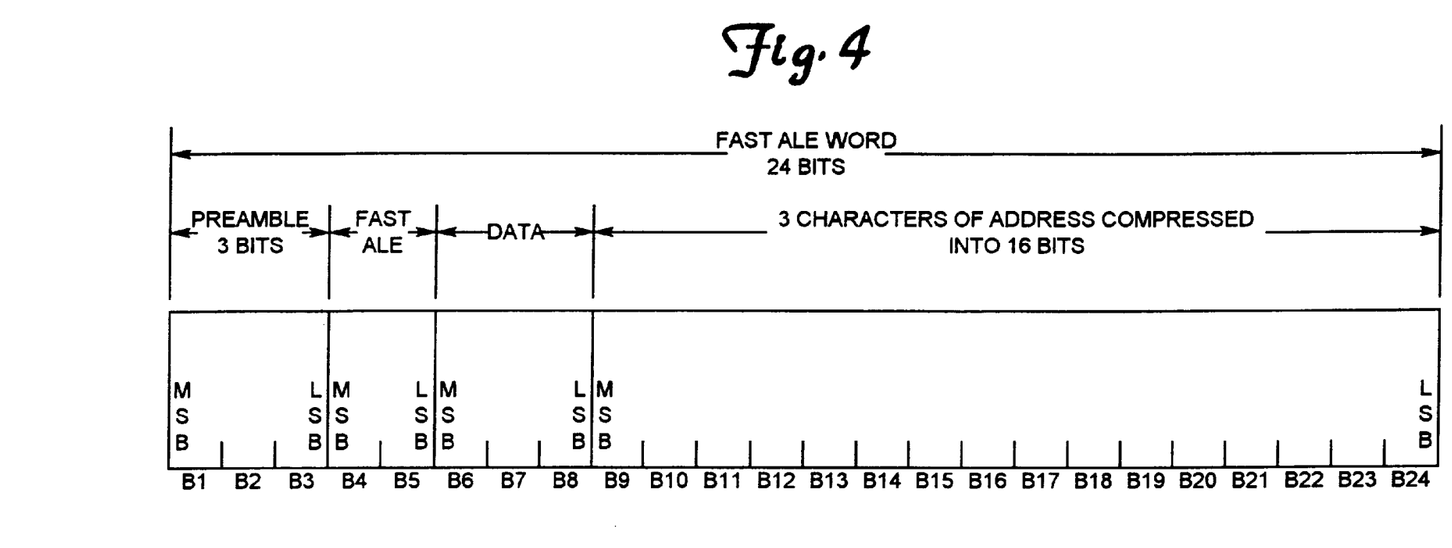
FIG. 4 is an illustration of the format of a 24 bit word in accordance with the fast ALE waveforms and protocols of the present invention.

A preferred format for the fast ALE words of the present invention is illustrated in FIG. 4. As was the case with the Notice 2 format, the fast ALE words are transmitted in a TRW manner. According to preferred embodiments of the present invention each 24-bit fast ALE word includes a three bit preamble (bits B1 through B3 in FIG. 4) similar to the preambles of the Notice 2 word format illustrated in FIG. 2, a two-bit Fast ALE waveform indicator (bits B4 and B5) which represents to receiving radios that the word format is the fast ALE format instead of the standard Notice 2 format, at least three data bits (at least bits B6 through B8), and a compressed representation of up to three ascii characters of an address (for example B9 through B24) If the address length for each radio is limited to be between one and six ascii-38 characters, it will take two 24-bit fast ALE words to complete the address.

If modulo-40 arithmetic or other data compression algorithms are implemented by controller 3 of each radio or station to pack the 21 bits associated with the three ascii characters (from the basic 38 character ascii subset defined for example at page 59 of Notice 2) of a word into less than 21 bits, the extra bits can be used to transmit data (for example LQA data, in ALE words where it was previously not possible to do so.

Figure 5:
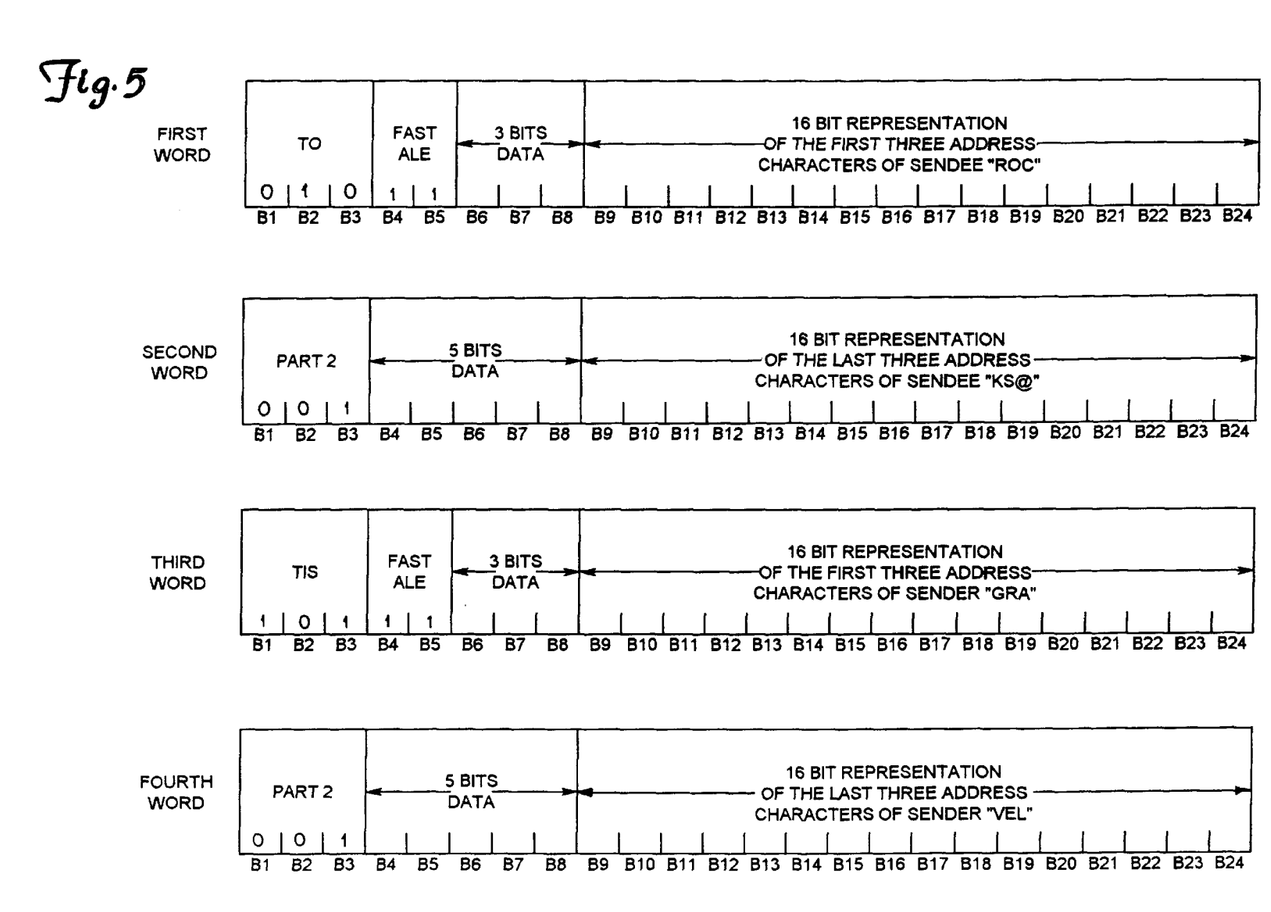
FIG. 5 illustrates four consecutive ALE words as part of a RESPONSE using the fast ALE waveforms and protocols of the present invention.

In preferred embodiments of the present invention, the three address characters of each word are packed into 16 bits, thus allowing 5 bits (bits B4 through B8) per ALE word for additional information to be transmitted. This translates into 10 bits of extra data for the two ALE words used to transmit an address having 6 characters. If two bits (e.g., bits B4 and B5) of each ALE word having the first portion of an address are used to identify the 24-bit ALE word format as a fast ALE word, then only three bits (B6 through B8) are available for transmitting other data such as LQA data. However, all five data bits (B4 through B8) are available during the word carrying the second part of the address (FIG. 5). Thus, a total of eight extra bits per two consecutive ALE words are available for data transmission. By providing a designation of the fast ALE format, for example by fixing the highest two information bits (bits B4 and B5) to be '11' when the first word of an address is transmitted (words starting with the preambles TO, TIS, TWAS), easy recognition of the fast ALE format is assured. This provides backward compatibility with radios only capable of performing link establishment using the standard Notice 2 protocol. If a radio cannot perform link establishment using the fast ALE protocols and format of the present invention, it is preferred that the radios of the present invention include the capability to communicate using the standard Notice 2 protocol. This information can be preloaded into radios and can be derived by observing found signals.

Using the following formula and the information in Table 1, modulo-40 arithmetic can be used to pack the 21 bits associated with each three address characters into 16 bits. For example, the address 'ABC' would be computed as:

TABLE 1

| (Value('A') * 1600) + (Value('B') *40) + Value ('C'). | |
|---|---|
| Char | Value |
| * | 0 |
| 0..9 | 1..10 |
| ? | 11 |
| @ | 12 |
| A..Z | 13..38 |
| — | 39 |

As stated above, other data compression or packing techniques can be used instead. Decoding of the 16 bits into the corresponding three characters simply involves well known decoding or decompression techniques correlated to the particular data compression technique used.

In some preferred embodiments, the added data capacity is used to transmit an LQA value representing a predicted bit error ratio (BER) resulting from interference and local noise in the range 0..31. A combination of measured bit error rate and SINAD (defined in Notice 2 as the signal-plus-noise-plus-distortion to noise-plus-distortion ratio) needs to be developed such that five bits of data valued 0 to 31 can represent the link quality during the linking process. Currently, the SINAD definition in Notice 2 limits reporting of the SINAD to 0 dB. However, with modern modems, reliable digital signaling can be achieved with SINADs of −10 dB. In the alternative, the additional bits can be used to change the SINAD range from −10 db to 21 db.

When an address of between 1–4 characters is used, even more bits in each pair of ALE words can be freed for the transmission of data. In the event of an address having only between 1–4 characters of data, the '@' symbol is used to indicate end-of-address. The extra characters can then be used for other data. The number of extra data bits available for a given address length is illustrated in Table 2 for preferred embodiments of the present invention. However, in other embodiments, more or less extra data bits may be available.

TABLE 2

| Address Length | Extra Data Bits |
|---|---|
| 1 character | 20 |
| 2 characters | 15 |
| 3 characters | 10 |
| 4 characters | 5 |

To get the extra bits of data, the @ character indicates the end of the address portion because the address is packed into two ALE words. The invention allows substitution of five bits of data to be carried in place of the unused address characters. The mapping of the data to modulo-40 values is shown below in Table 3.

TABLE 3

| DATA VALUE | MODULO 40 VALUE |
|---|---|
| Undefined | 0 |
| 0 | 1 |
| 1 | 2 |
| . | . |
| . | . |
| . | . |
| 31 | 32 |
| Undefined | 33 |

TABLE 3-continued

| DATA VALUE | MODULO 40 VALUE |
|---|---|
| Undefined | 34 |
| Undefined | 35 |
| Undefined | 36 |
| Undefined | 37 |
| Undefined | 38 |
| Undefined | 39 |

B. Modification of Preambles of ALE

The preambles of the fast ALE waveforms of the present invention are substantially the same as those discussed above with reference to the Notice 2 format, with the following exceptions. First, the preamble THRU is replaced with the preamble PART2. The preamble PART2 indicates that this is the 2nd word (for example containing the second part of an address). Second, the FROM preamble is replaced with the preamble INLINK. The INLINK preamble indicates that this is part of a LINKED state transaction.

C. Example

FIG. 5 illustrates a four ALE word transmission from station 200 (shown in FIG. 1 and having the address GRAVEL assigned to it) to station 100 (having the address ROCKS assigned to it). The four ALE word transmissions can be, for example, a RESPONSE to a CALL from station 100 to station 200. While shown as four consecutive ALE words it should be understood that the actual transmission will be in a TRW format. As can be seen in FIG. 5, the first ALE word begins with the three bit representation of the preamble TO. Next, bits B4 and B5 are set to the preselected values (11) which have been defined as representing that the first and second ALE words are in the fast ALE format of the present invention. Next, three bits of data such as LQA data are transmitted in bits B6 through B8. Finally, a 16 bit compressed representation of the first three characters (ROC) of the addressee or intended recipient are transmitted.

The second ALE word transmitted from station 200 begins with the preamble PART2, includes five bits of data, and ends with the 16 bit representation of the final two characters (plus the symbol @) of the address assigned to station 100 (KS@). Therefore, in this particular fast ALE embodiment, 8 extra bits of data have been transferred in the first two ALE words.

The third ALE word transmitted from station 200 begins with the preamble THIS IS (sometimes referred to as TIS), includes the two bit designation of the word as being in a fast ALE word format, follows with three bits of data, and ends with the 16 bit representation of the first three characters of the sender's address (GRA). The fourth and final ALE word of the RESPONSE from GRAVEL to ROCKS beans with the preamble PART2, follows with 5 bits of data, and ends with the 16 bit representation of the last three characters of the senders address (VEL) . Thus, each two consecutive ALE words provide 8 additional bits for the transmission of data, other than preamble or address data, between the two radios or stations. If used to transmit LQA data, this reduces or eliminates the need for the transmission of additional ALE words just to exchange the LQA data.

D. Modifications to the Timing Aspects of Standard ALE

In the following discussion of timing aspects of the fast ALE protocols of the present invention, times have generally been rounded up to the nearest one tenth of a second when doing so simplifies the discussion. In the fast ALE methods of the present invention, the maximum effective scan dwell is limited to 160 ms. On a 10 channel scan list, this insures that the full address is heard. Thus, faster scan rates are allowed. In preferred embodiments, the scan broadcast is limited to nine ALE words having preambles as follows:
TO, TO, PART2, TO, PART2, TO, PART2, TIS, PART2 This reduces the scan broadcast or CALL time to 3.6 second (9 ALE words * 0.4 seconds per ALE word).

The RESPONSE broadcast is shortened to be one full address each of the sender and receiver. Thus, in preferred embodiments, the RESPONSE is limited to four ALE words having preambles as follows:
TO, PART2, TIS, PART2 This reduces the RESPONSE broadcast time to 1.6 seconds (4 words * 0.4 seconds per word).

The ACKNOWLEDGE broadcast is shortened to include one address, the address of the sender. Thus in preferred embodiments, the ACKNOWLEDGE is limited to two ALE words having preambles as follows:
TIS, PART2 This reduces the ACKNOWLEDGE broadcast time to 0.8 seconds (2 words * 0.4 seconds per word).

Figure 6:
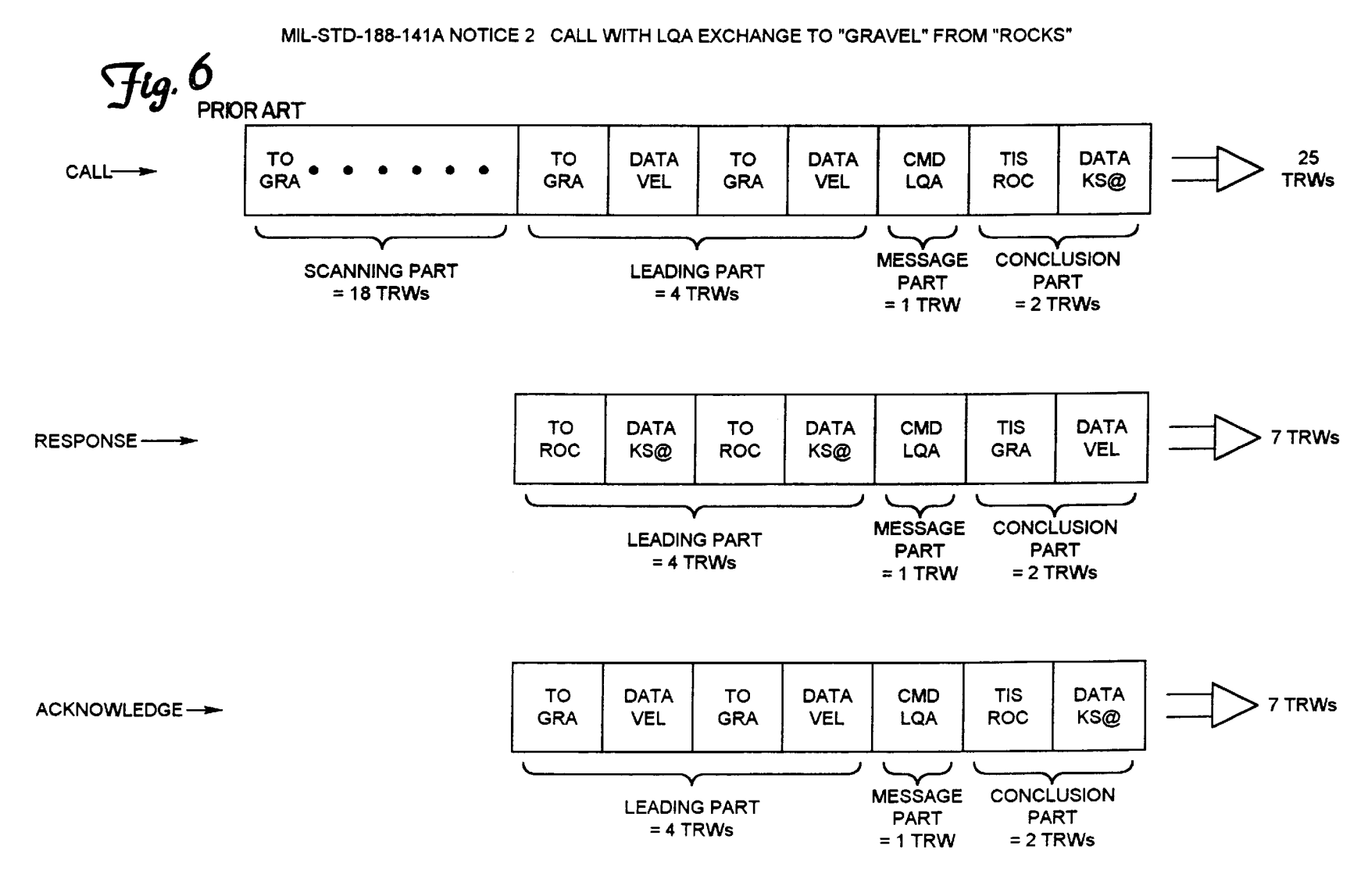
FIG. 6 is an illustration of the number of ALE words required to establish a link using the prior art ALE waveform and protocol.
Figure 7:
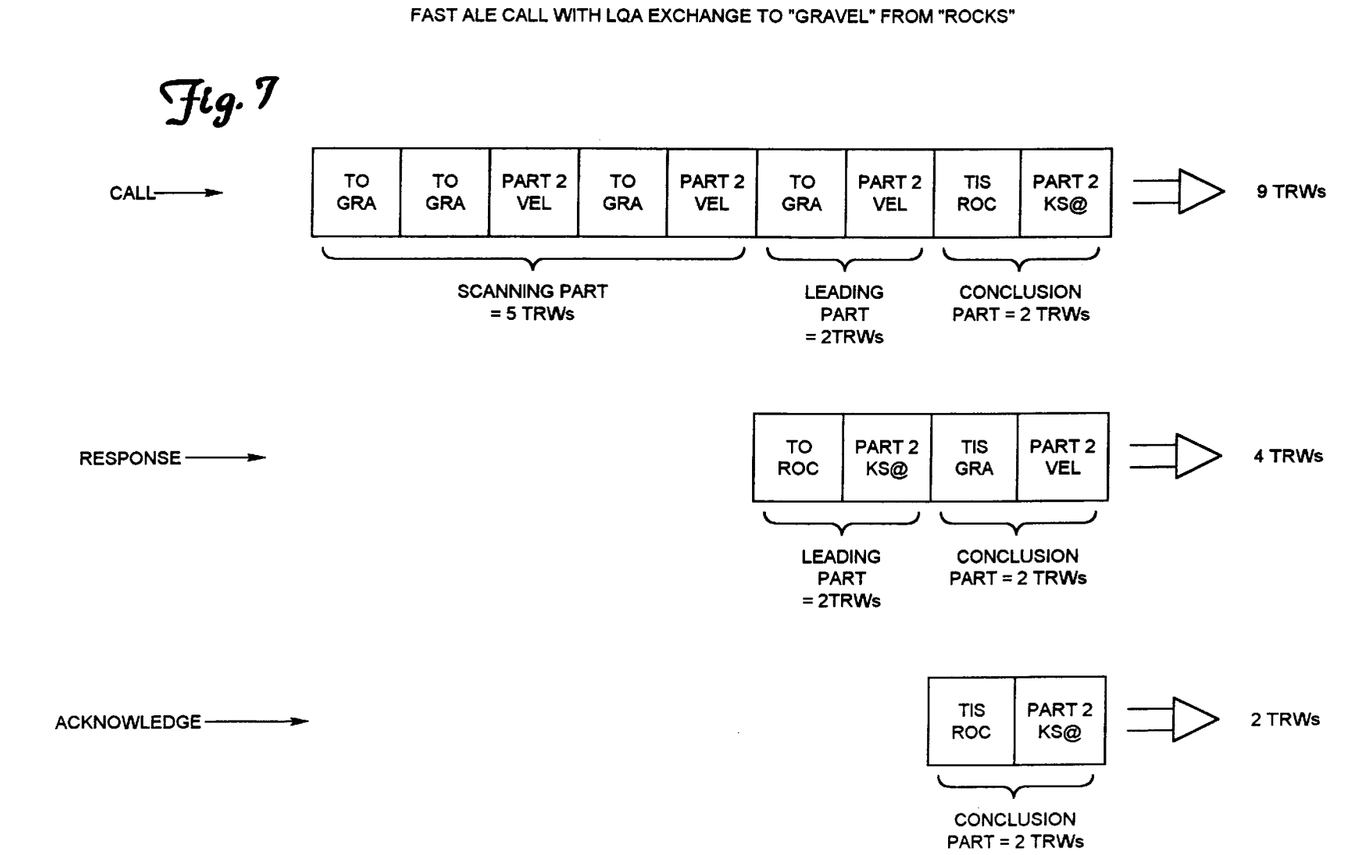
FIG. 7 is an illustration of the number of ALE words required to establish a link using the fast ALE waveforms and protocols of the present invention.

FIGS. 6 and 7 provide a comparison of the CALL, RESPONSE and ACKNOWLEDGE transmissions required using the conventional ALE Notice 2 format and protocol (FIG. 6) and the fast ALE format and protocol of the present invention (FIG. 7). The examples of FIGS. 6 and 7 illustrate exchanges beginning with a CALL from ROCKS to GRAVEL. As can be seen, with the conventional Notice 2 protocol requiring a 25 ALE word CALL, a 7 ALE word RESPONSE and a 7 ALE word ACKNOWLEDGE, the present invention minimizes the time required for link establishment by reducing the number of ALE words transmitted from 39 to 15.

E. Features Maintained from 141A

LPO-LPx; unit calls; Star Net calls; ANY calls and ALL calls; LQA exchange (always embedded without taking an extra TRW); AMD, DTM or DBM provided once in a link; user unique functions; and sounds. The time to broadcast a "guaranteed to hear sound" is reduced to 'twas, part2, twas, part2, twas, part2' for a channel occupancy time of 2.4 seconds as compared to 7 or more seconds using Notice 2.

F. Features Not Supported from 141A (1) Group call—instead use LINKED_STATE calling protocol to add on more members. (2) Early identification of transmitter's address for extended transmit protocol. (TO, TO, FROM, CMD AMD, TIS=FROM). Use inlink amd message transfer. AMD, DTM, DBM are not provided during link set up—use inlink amd message transfer.

To keep link times short, only information needed for the linking activity is contained in the handshake transmissions. The AMD, DTM, and DBM information is information to transmit once a link is established.

G. Linked State Commands

Upon completion of the 3-way handshake, the HF radios have the ability to exchange information using the selected frequency until interference and or propagating conditions result in unreliable information exchange. This information can be in the form of voice or data. Additional signaling protocols may be desirable that allow higher data throughput rates than available through the FSK signaling structure. This invention establishes minimal procedural protocols to allow HF radios to use voice or data as the exchange method until at least one radio no longer wishes to transact business through the selected HF channel. The protocols described provide all interested parties using the channel with sufficient information to determine what actions are required. The protocol changes the normal Notice 2 frame layout where the transmitting radio ends its transmission with the 'Conclusion Section' to have the transmitting unit identify itself at the beginning of the transmission using its address and the preambles INLINK and PART2. Inlink transmission time is reduced because only the originating (transmitting) address is emitted. Because the 1–6 character address is compressed and the all radios linked with the radio know they are in a LINKED STATE, all 10 data bits are available for the data referring to the INLINK transaction being performed. Table 4 depicts the preferred inlink transactions and the value of the 10 bits of data provided in the 2 TRWs sent using the INLINK and PART2 preambles.

TABLE 4

| Reason for Inlink Transmission | Preambles and words that are transmitted | Binary Data INLINK | PART2 |
| --- | --- | --- | --- |
| I am returning to scan | Inlink, Part2 | 10001 | 00000 |
| Directed Return to scan to an individual | Inlink, Part2, To, Part2 | 10010 | 00000 |
| Everyone linked with me Return to scan | Inlink, Part2 | 10011 | 00000 |
| AMD message Stay in inlink xxxxx is the number of TRWs in the message | Inlink, Part2, TRWs of AMD Message | 10100 | xxxxx |
| AMD message Leave after message xxxxx is the number of TRWs in the message | Inlink, Part2, TRWs of AMD Message | 10100 | xxxxx |
| DTM Message → ARQ wanted | Inlink, Part2, TRWs of Message | 10110 | 00000 |
| DTM Message → No ARQ needed | Inlink, Part2, TRWs of Message | 10110 | 00001 |
| DTM Message → ACK msg | Inlink, Part2, TRWs of Message | 10110 | 00010 |
| DTM Message → NAK msg | Inlink, Part2 | 10110 | 00011 |
| I'm Still Talking, reset your return to scan timer | Inlink, Part2 | 10111 | 00000 |

H. Time Comparisons

Most User networks use between 4 and 6 character addresses. The 500 ms dwell used in the Notice 2 ALE protocol results in an 8.0 second scanning CALL part. Therefore, the CALL always includes: scanning CALL part (8.0 seconds)+leading part (1.6 seconds)+lqacmd (0.4 seconds)+conclusion (0.8 seconds)=10.8 seconds The RESPONSE always includes:

leading part (0.8 seconds)+lqacmd (0.4 seconds)+conclusion (0.8 seconds)=2.8 seconds The ACKNOWLEDGE always includes:

leading part (0.8 seconds)+lqacmd (0.4 seconds)+conclusion (0.8 seconds)=2.8 seconds Thus, the total link transmission time using the Notice 2 protocol is 16.4 seconds (10.8+2.8+2.8).

In contrast, using the present invention, the total link transmission time requires only 6 seconds (3.6 seconds for the 9 ALE word CALL, 1.6 seconds for the 4 ALE word RESPONSE, and 0.8 seconds for the 2 ALE word ACKNOWLEDGE). In both cases the times exclude 2 turn-around (TA) times and tune times. Turn-around times can be reduced because no ambiguity exists for the total number of address words (i.e., is it 1, 2, 3, 4 or 5 ALE words long).

TABLE 5

| Communication Transaction | Notice 2 | Fast ALE |
| --- | --- | --- |
| Call With Scan | 16.4 + 2 TA | 6.0 + 2 TA |
| Call With Scan + Exit Link | 18.8 + 3 TA | 6.8 + 2 TA |
| Call With Scan + AMD msgs and + Exit Link | 60.8 + 8 TA | 29.6 + 3 TA |

Table 5 shows the time in seconds that an ALE modem is actively transmitting using 4–6 character addresses for both the conventional ALE protocol and for the fast ALE protocol of the present invention. In the table, automatic message display (AMD) or orderwire, which is defined in Notice 2, is considered a 50 character message (17 ALE words). Notice 2 requires a three-way handshake on AMDs. The present invention benefits from both fewer and from faster TAs, as compared to Notice 2.

Although the present invention has been described with reference to preferred embodiments, workers skilled in the art will recognize that changes may be made in form and detail without departing from the spirit and scope of the invention.

What is claimed is:

1. An automatic link establishment (ALE) method of establishing a link in a high frequency (HF) communication system between first and second stations, the first and second stations having first and second addresses assigned respectively thereto, the method comprising:

transmitting a first 24 bit word from the first station to the second station, wherein the first word includes:

a three bit preamble designating that the first word includes address information of one of the first and second stations identifying either the second station as the intended recipient or the first station as the sender;

at least 3 bits of data to be transmitted from the first station to the second station, wherein the at least 3 bits of data are indicative of information other than preamble and address information; and no more than 16 address bits identifying a first three characters of one of the first and second addresses assigned to the first and second stations, wherein each of the first three characters of the one of the first and second addresses is an alphanumeric character.

2. The ALE method of claim 1, and after transmitting the first word, further comprising:

transmitting a second 24 bit word from the first station to the second station, wherein the second word includes:

a three bit preamble designating that the second word contains a second portion of the one of the first and second addresses identifying either the second station as the intended recipient or the first station as the sender;

at least 3 bits of data to be transmitted from the first station to the second station, wherein the at least 3 bits of data are indicative of information other than preamble and address information; and no more than 16 address bits identifying up to three additional characters of the one of the first and second addresses assigned to the first and second stations, wherein each of the up to three additional characters is an alphanumeric character.

3. The ALE method of claim 2, wherein the first and second words are first and second portions of a RESPONSE by the first station to a CALL by the second station, wherein the no more than 16 bits of the first and second words identify characters of the second address, and wherein after transmitting the second word the method further comprises:

transmitting a third 24 bit word from the first station to the second station, wherein the third word includes:

a three bit preamble designating that the third word contains a first portion of the first address assigned to the first station and identifying the first station as the sender;

at least 3 bits of data to be transmitted from the first station to the second station, wherein the at least 3 bits cf data are indicative of information other than preamble and address information; and no more than 16 address bits identifying a first three characters of the first address assigned to the first station, wherein each of the first three characters of the first address is an alphanumeric character.

4. The ALF, method of claim 3, and after transmitting the third word, further comprising:

transmitting a fourth 24 bit word from the first station to the second station, wherein the fourth word includes:

a three bit preamble designating that the fourth word contains a second portion of the first address identifying the first station as the sender;

at least 3 bits of data to be transmitted from the first station to the second station, wherein the at least 3 bits of data are indicative of information other than preamble and address information; and no more than 16 address bits identifying up to three additional characters of the first address assigned to the first station, wherein each of the up to three additional characters is an alphanumeric character.

5. The ALE method of claim 4, wherein data contained in the at least 3 bits of at least one of the first, second, third and fourth words is link quality analysis (LQA) data identifying qualities of HF channel links between the first and second stations.

6. The ALE method of claim 5, wherein the three bit preamble of the first word is a "TO" preamble as defined in MIL-STD-188-141A Notice 2.

7. The ALE method of claim 6, wherein the three bit preamble of the third word is a "THIS IS" preamble or a "THIS WAS" preamble as defined in MIL-STD-188-141A Notice 2.

8. The ALE method of claim 7, wherein the three bit preambles of the second and fourth words are PART2 preambles that replace THRU preambles defined in MIL-STD- 188-141A Notice 2.

9. The ALE method of claim 2, wherein the first and second words are first and second portions of an ACKNOWLEDGE by the first station to a RESPONSE by the second station to a CALL by the first station, wherein the no more than 16 bits of the first and second words identify characters of the first address.

10. The ALE method of claim 2, wherein the first word further includes two bits identifying whether the first word complies with the ALE word protocol defined in MIL-STD-188-141A Notice 2, and wherein two corresponding bits in the second word are used to transmit data from the first station to the second station so that the second word includes at least 5 bits of data to be transmitted from the first station to the second station, wherein the at least 5 bits of data are indicative of information other than preamble and address information.

11. The ALE method of claim 1, wherein the first word further includes two bits identifying whether the first word complies with the ALE word protocol defined in MIL-STD-188-141A Notice 2.

12. A high frequency (HF) radio having automatic link establishment (ALE), the high frequency radio comprising:
   a controller adapted to generate ALE 24 bit words for use in establishing a link between the HF radio and a second HF radio, wherein the controller is adapted to generate the words such that each word includes:
      a three bit preamble designating the type of information included in the word;
      a compressed representation of three characters of a first address assigned to one of the HF radio and the second HF radio, wherein each of the first three characters of the first address is an alphanumeric character having a 7 bit code associated therewith, wherein the compressed representation of the three characters has less than 21 bits; and
      at least one data bit containing data to be transmitted from the HF radio to the second HF radio during link establishment, wherein the at least one data bit is indicative of information other than preamble and address information;
   an antenna for transmitting and receiving HF signals;
   transmitter circuitry coupled to, the controller and to the antenna for converting the words into HF signals for transmission by the antenna, and
   receiver circuitry coupled to the controller and to the antenna for converting HF signals received during link establishment into words to be provided to the controller.

13. The HF radio of claim 12, wherein the compressed representation of the three characters has about 16 bits.

14. The HF radio of claim 13, wherein the compressed representation of the three characters is generated by the HF radio using modulo-40 arithmetic.

15. The HF radio of claim 14, wherein the at least one data bit containing data to be transmitted from the HF radio to the second HF radio during link establishment is indicative of link quality analysis information.

16. The HF radio of claim 15, wherein the three bit preamble designating the type of information included in the word includes a preamble selected from a list of preambles including TO, COMMAND, THIS IS, THIS WAS, DATA and REPEAT as defined in MIL-STD-188-141A Notice 2.

17. The HF radio of claim 16, wherein the three bit preamble designating the type of information included in the word further includes a preamble selected from a list of preambles further including PART2 and INLINK that respectively replace THRU and FROM preambles defined in MIL-STD-188-141A Notice 2.

18. A method of establishing a link between a first high frequency (HF) radio and a second HF radio, the method comprising:
   transmitting a CALL from the first HF radio to the second HF radio, wherein the CALL includes nine automatic link establishment (ALE) words, wherein the nine ALE words begin with the preambles TO, TO, PART2, TO, PART2, TO, PART2, TIS, and PART2, respectively wherein TO and TIS preambles are defined in MIL-STD-188-141A Notice 2 and PART2 preambles replace THRU preambles defined in MIL-STD-188-141A Notice 2;
   upon receipt of the CALL by the second HF radio, transmitting a RESPONSE from the second HF radio to the first HF radio, wherein the RESPONSE includes four ALE words, wherein the four ALE words begin with the preambles TO, PART2, TIS, and PART2, respectively;
   upon receipt of the RESPONSE by the first HF radio, transmitting an ACKNOWLEDGE from the first HF radio to the second HF radio, wherein the ACKNOWLEDGE includes two ALE words, wherein the two ALE words begin with the preambles TIS and PART2, respectively.

19. The method of claim 18, wherein each of the ALE words of the CALL, the RESPONSE and the ACKNOWLEDGE includes:
   a three bit preamble designating the type of information included in the word;
   a compressed representation of three characters of an address assigned to one of the first HF radio and the second HF radio, wherein each of the first three characters is an alphanumeric character having a 7 bit code associated therewith, wherein the compressed representation of the three characters has less than 21 bits; and
   at least one data bit containing data to be transmitted between the first and second HF radios during link establishment, wherein the at least one data bit is indicative of information other than preamble and address information.

20. The method of claim 19, wherein the at least one data bit containing data to be transmitted between the first and second HF radios during link establishment is indicative of link quality analyses information.

* * * * *